United States Patent
Tai et al.

(10) Patent No.: US 11,946,771 B2
(45) Date of Patent: Apr. 2, 2024

(54) AERIAL VEHICLE AND ORIENTATION DETECTION METHOD USING SAME

(71) Applicant: INDUSTRIAL TECHNOLOGY RESEARCH INSTITUTE, Hsinchu (TW)

(72) Inventors: Yuan-Chu Tai, Hsinchu (TW); Chung-Hsien Wu, Hsinchu (TW); Yu-Kai Wang, Dalin Township, Chiayi County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 881 days.

(21) Appl. No.: 16/837,415

(22) Filed: Apr. 1, 2020

(65) Prior Publication Data
US 2021/0310804 A1    Oct. 7, 2021

(51) Int. Cl.
*G01C 3/18*    (2006.01)
*B64D 43/00*   (2006.01)
*G01C 21/20*   (2006.01)

(52) U.S. Cl.
CPC .............. *G01C 3/18* (2013.01); *B64D 43/00* (2013.01); *G01C 21/20* (2013.01)

(58) Field of Classification Search
CPC ........ G01C 3/18; G01C 21/20; G01C 21/005; B64D 43/00; B64U 2101/30; B64U 2201/00; B64C 39/024
See application file for complete search history.

(56) References Cited

U.S. PATENT DOCUMENTS

| 5,021,792 | A |   | 6/1991 | Hwang |
| 5,220,508 | A |   | 6/1993 | Ninomiya et al. |
| 5,598,163 | A | * | 1/1997 | Cornic ................. G01S 13/426 342/107 |
| 5,790,403 | A |   | 8/1998 | Nakayama |
| 7,412,775 | B1 |  | 8/2008 | Karnick et al. |
| 8,196,835 | B2 |  | 6/2012 | Emanuel et al. |

(Continued)

FOREIGN PATENT DOCUMENTS

CN    103339525 A    10/2013
CN    103424115 A    12/2013
(Continued)

OTHER PUBLICATIONS

WO 2020056598 English translation (Year: 2023).*
(Continued)

*Primary Examiner* — Jelani A Smith
*Assistant Examiner* — Paul A Castro
(74) *Attorney, Agent, or Firm* — Birch, Stewart, Kolasch & Birch, LLP

(57) ABSTRACT

An aerial vehicle including a body, a first ranging device, a second ranging device and a controller is provided. The first ranging device is disposed on the body and is configured to detect a first distance between the first ranging device and the reflector. The second ranging device is disposed on the body and is configured to detect a second distance between the second ranging device and the reflector. The controller is configured to obtain an included angle between a direction of the body and the reflector according to the first distance and the second distance.

20 Claims, 7 Drawing Sheets

(56) References Cited

U.S. PATENT DOCUMENTS

| | | | | |
|---|---|---|---|---|
| 8,649,999 | B1* | 2/2014 | Sheng | G01P 21/00 |
| | | | | 702/141 |
| 2012/0033196 | A1* | 2/2012 | Vanek | G01S 7/4808 |
| | | | | 356/4.01 |
| 2014/0222361 | A1* | 8/2014 | Sheng | G01P 21/00 |
| | | | | 702/96 |
| 2017/0076616 | A1 | 3/2017 | Kanade et al. | |
| 2019/0187725 | A1 | 6/2019 | Zhang et al. | |

FOREIGN PATENT DOCUMENTS

| | | |
|---|---|---|
| CN | 104950313 A | 9/2015 |
| CN | 106104203 A | 11/2016 |
| CN | 205787903 U | 12/2016 |
| CN | 108680941 A | 10/2018 |
| CN | 109407071 A | 3/2019 |
| CN | 110045742 A | 7/2019 |
| CN | 110892286 A | 3/2020 |
| DE | 195 36 601 A1 | 3/1997 |
| JP | 2000-258532 A | 9/2000 |
| JP | 2017-75863 A | 4/2017 |
| TW | I652205 B | 3/2019 |
| TW | I656325 B | 4/2019 |
| WO | WO 2020/056598 A1 | 3/2020 |
| WO | WO-2020056598 A1 * | 3/2020 |

OTHER PUBLICATIONS

Gade, "The Seven Ways to Find Heading", The Journal of Navigation, vol. 69, No. 5, Sep. 2016, pp. 955-970.

Hafskjold et al., "Integrated Camera-Based Navigation", The Journal of Navigation, May 2000, 11 pages total.

Iozan et al., "North Finding System Using a MEMS Gyroscope", URL: https://www.researchgate.net/publication/228416118, Jan. 2010, 9 pages total.

Samaan et al., "Compass star tracker for GPS-like applications", IEEE Transactions on Aerospace and Electronic Systems, Nov. 2008, 14 pages total.

Yang et al., "Two Antennas GPS-Aided INS for Attitude Determination", IEEE Transactions on Control Systems Technology, vol. 11, No. 6, Nov. 2003, pp. 905-918.

* cited by examiner

AERIAL VEHICLE AND ORIENTATION DETECTION METHOD USING SAME

TECHNICAL FIELD

The disclosure relates in general to a vehicle and a direction detecting method using the same, and more particularly to an aerial vehicle and a direction detecting method using the same.

BACKGROUND

The generally known aerial vehicle normally includes a video recorder which captures the ambient image ahead of the aerial vehicle. By analyzing the ambient image, the aerial vehicle can determine its relation with the ambient environment. For example, the aerial vehicle can determine whether the aerial vehicle is flying towards a target or an obstacle. However, as the ambient brightness of the aerial vehicle dims, the ambient image captured by the aerial vehicle will be obscure, and the determination made by the aerial vehicle will be inaccurate. Therefore, it has become one of the objects for the industries to provide a technology for resolving the generally known problems disclosed above.

SUMMARY

The disclosure is directed to an aerial vehicle and a direction detecting method using the same for resolving the generally known problems disclosed above.

According to one embodiment, an aerial vehicle is provided. The aerial vehicle includes a body, a first ranging device, a second ranging device and a controller. The first ranging device is disposed on the body, and is configured to detect a first distance between the first ranging device and a reflector. The second ranging device is disposed on the body, and is configured to detect a second distance between the second ranging device and the reflector. The controller is configured to obtain an included angle between a direction of the body and the reflector according to the first distance and the second distance.

According to another embodiment, a direction detecting method is provided. The direction detecting method includes the following steps: detecting a first distance between the first ranging device and a reflector by a first ranging device of an aerial vehicle; detecting a second distance between the second ranging device and the reflector by a second ranging device of the aerial vehicle; and, obtaining an included angle between a direction of a body of the aerial vehicle and the reflector by the controller of the aerial vehicle according to the first distance and the second distance.

The above and other aspects of the disclosure will become better understood with regard to the following detailed description of the preferred but non-limiting embodiment (s). The following description is made with reference to the accompanying drawings.

Figure 1A:
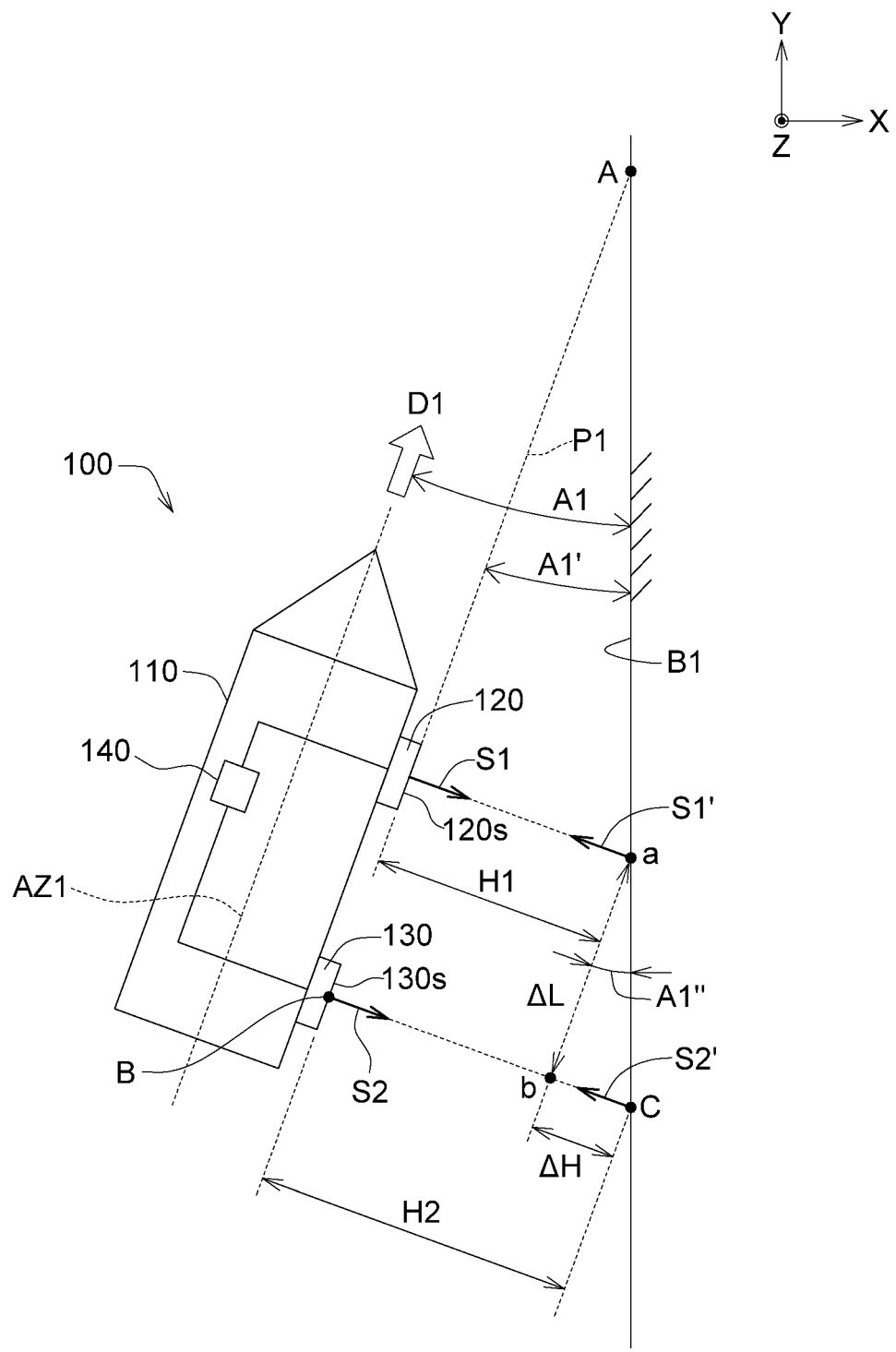
FIG. 1A is a schematic diagram of an aerial vehicle according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
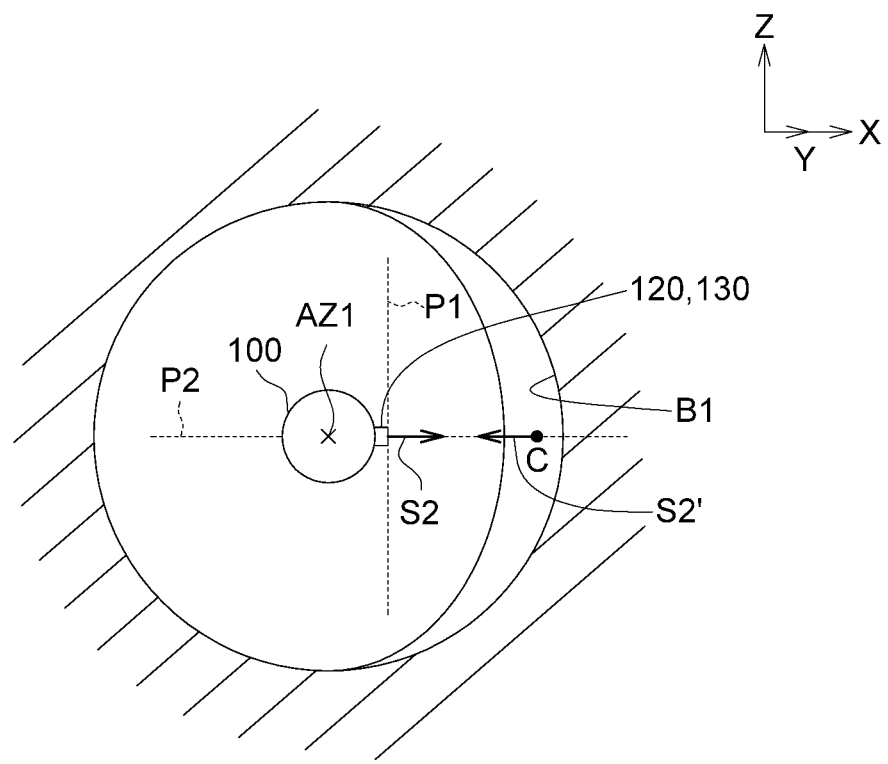
FIG. 1B is a schematic diagram of an aerial vehicle and a reflector viewed from the tail of the aerial vehicle of FIG. 1A.
Figure 1C:
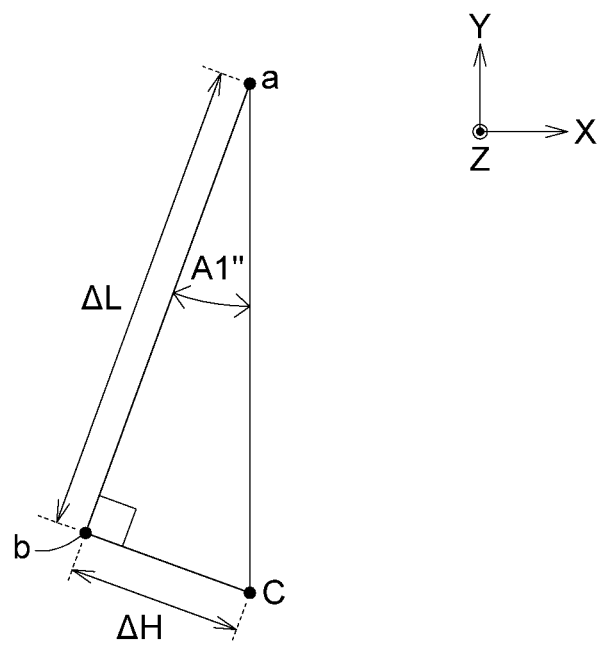
FIG. 1C is a geometric relation diagram of the aerial vehicle of FIG. 1A relative to the reflector.

Refer to FIGS. 1A and 1B. FIG. 1A is a schematic diagram of an aerial vehicle 100 according to an embodiment of the present disclosure. FIG. 1B is a schematic diagram of an aerial vehicle 100 and a reflector viewed from the tail of the aerial vehicle of FIG. 1A. FIG. 1C is a geometric relation diagram of the aerial vehicle 100 of FIG. 1A relative to the reflector. The aerial vehicle 100 can be an unmanned aerial vehicle or a passenger aircraft or a cargo aircraft.

As indicated in FIG. 1A, the aerial vehicle 100 includes a body 110, a first ranging device 120, a second ranging device 130 and a controller 140. The first ranging device 120 is disposed on the body 110 and is configured to detect a first distance H1 between the first ranging device 120 and the reflector B1. The second ranging device 130 is disposed on the body 110 and is configured to detect a second distance H2 between the second ranging device 130 and the reflector B1. The controller 140 is configured to obtain an included angle A1 between a direction D1 of the body 110 and the reflector B1 according to the first distance H1 and the second distance H2. Thus, the aerial vehicle 100 can correct the route according to the obtained angle A1. Besides, during the flight process, the aerial vehicle 100 continues (along with the time) to obtain the latest (or most updated) included angle A1 to continuously correct the route.

In the present disclosure, "direction" refers to the orientation of the aerial vehicle 100, such as the direction along the longitudinal axis AZ1. Based on the types and/or the flight features of the aerial vehicle 100, "direction" refers to the flight direction, such as flying forward or backward, but the present disclosure is not limited thereto. In the present disclosure, "included angle A1" refers to the angle formed between the flight direction of the aerial vehicle 100 and the reflector B1. For example, when the aerial vehicle 100 flies forwards, the included angle A1 is a head angle, which is an angle between the head and the reflector B1. When the aerial vehicle 100 flies backwards, the included angle A1 is a tail angle, which is an angle between the tail and the reflector B1.

In an application, the controller 140 of the aerial vehicle 100 determines whether the direction D1 is directed towards a target (not illustrated) according to the included angle A1. If the direction D1 is not directed towards the target, the aerial vehicle 100 corrects the route and causes the direction D1 to be directed towards the target. In another application, the controller 140 of the aerial vehicle 100 determines whether the body 110 and the reflector B1 keep a safety distance according to the included angle A1 and the first distance H1 and the second distance H2. For example, if one of the first distance H1 and the second distance H2 (such as the smaller one) of the aerial vehicle 100 is smaller than a safety distance and the included angle A1 is smaller than a safety angle, the controller 140 of the aerial vehicle 100 determines that the body 110 and the reflector B1 do not keep the safety distance, and accordingly corrects the route and cause the body 110 and the reflector B1 to keep the safety distance. To summarize, the aerial vehicle 100 of the present disclosure flies towards the target according to the first distance H1 and the second distance H2 and keeps the safety distance with the ambient reflector during the flight process.

As indicated in FIGS. 1A and 1B, the first ranging device 120 emits a first detection signal S1, which is then reflected from the first detection signal S1 and becomes a first reflective signal S1' received by the first ranging device 120. The second ranging device 130 emits a second detection signal S2, which is then reflected from the reflector B1 and becomes a second reflective signal S2 received by the second ranging device 130. In an embodiment, the controller 140 calculates the first distance H1 according to the first detection signal S1 and the first reflective signal S1', and calculates the second distance H2 according to the second detection signal S2 and the second reflective signal S2'. In another embodiment, the first ranging device 120 independently calculates the first distance H1 according to the first detection signal S1 and the first reflective signal S1', and the second ranging device 130 independently calculates the second distance H2 according to the second detection signal S2 and the second reflective signal S2'. As long as the aerial vehicle 100 can obtain the first distance H1 and the second distance H2, the present disclosure does not restrict the method employed by the aerial vehicle 100.

As indicated in FIG. 1A, the first ranging device 120 is located in front of the second ranging device 130 along the direction D1 (such as towards the front end of the longitudinal axis AZ1). In an embodiment, the first ranging device 120 and the second ranging device 130 can be realized by such as time of flight (ToF) ranging devices, sonar ranging devices or other ranging devices. Since the first ranging device 120 and the second ranging device 130 are signal emission type ranging devices, the aerial vehicle 100 can be operated at an environment with low brightness level, such as tunnel (illustrated in FIG. 1B), basement, or night. Moreover, the reflector B1 can be an object in the environment, such as wall, obstacle, building or living creature. Let the reflector B1 be exemplified by a tunnel. The inner wall of the reflector B1 is a cylinder and can be regularly extended along a straight line. However, the present disclosure does not restrict the types, the surface contour and/or the extension pattern of the reflector B1.

As indicated in FIG. 1A, the body 110 has a longitudinal axis AZ1, a first reference plane P1 and a second reference plane P2. The longitudinal axis AZ1 is such as the center axis of the body 110, but the present disclosure is not limited thereto. The direction D1 and the longitudinal axis AZ1 are parallel to each other, such as overlap each other. The first reference plane P1 and the second reference plane P2 substantially are perpendicular to each other. As indicated in the diagram, the XY plane is such as perpendicular to the first reference plane P1 and parallel to the second reference plane P2, and the Z axis is such as perpendicular to the XY plane. In the present embodiment, the first ranging device 120 and the second ranging device 130 are such as co-planar. For example, the first ranging device 120 has a first signal emission surface 120s, and the second ranging device 130 has a second signal emission surface 130s, and the first signal emission surface 120s and the second signal emission surface 130s are co-planar, for example, overlap the first reference plane P1. In another embodiment, the first signal emission surface 120s and the second signal emission surface 130s are spaced along a direction perpendicular to the first reference plane P1.

In the present embodiment, as indicated in FIG. 1B, the extending of the second reference plane P2 passes through the first signal emission surface 120s, the second signal emission surface 130s and the longitudinal axis AZ1, such that the first distance H1 and the second distance H2 are located on the same datum plane (the second reference plane P2 of FIG. 1B) with the direction D1, and the angle obtained according to the first distance H1 and the second distance H2 gets closer to the actual included angle A1 of the body 110. Additionally, the first reference plane P1 is substantially parallel to the direction D1, such that the included angle A1' between the first reference plane P1 and the reflector B1 is equivalent to the included angle A1 between the direction D1 and the reflector B1.

As indicated in FIG. 1A, the second distance H2, the first reference plane P1, the included angle A1' and the reflector B1 form a right triangle ABC, wherein the included angle A1' is formed between the first reference plane P1 and the reflector B1 of the right triangle ABC. As indicated in FIGS. 1A and 1C, the distance ΔL between the first ranging device 120 and the second ranging device 130 along the longitudinal axis AZ1 and the distance difference ΔH between the first distance H1 and the second distance H2 form a right triangle abC containing an included angle A1". Since the right triangle abC is an approximate triangle of the right triangle ABC, the included angle A1" is equivalent to the included angle A1', and the included angle A1 can be obtained as long as the included angle A1" is obtained. The included angle A1" can be obtained according to formula (1) below:

$$A1 = A1' = A1'' = \tan^{-1}\left(\frac{\Delta H}{\Delta L}\right) \quad (1)$$

Figure 2A:
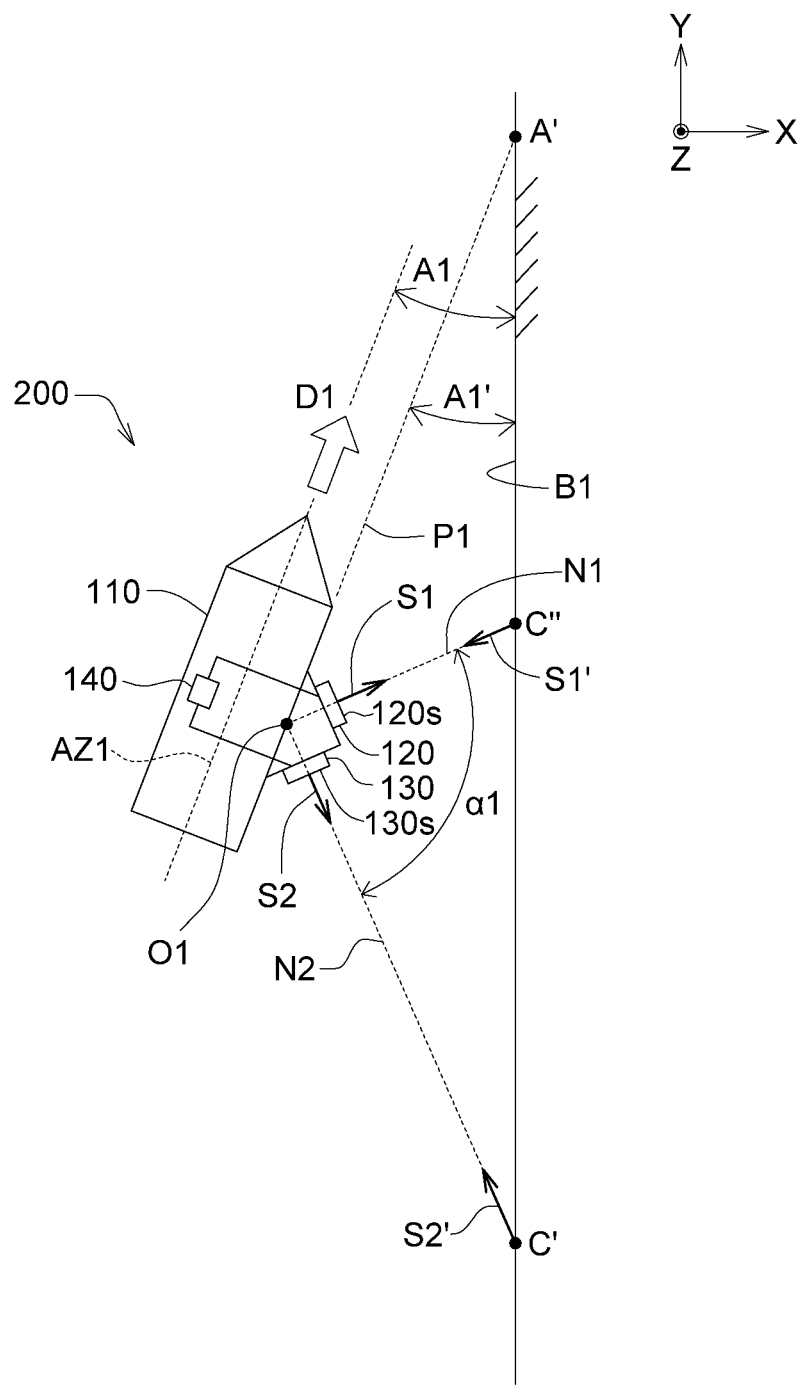
FIG. 2A is a schematic diagram of an aerial vehicle according to another embodiment of the present disclosure.
Figure 2B:
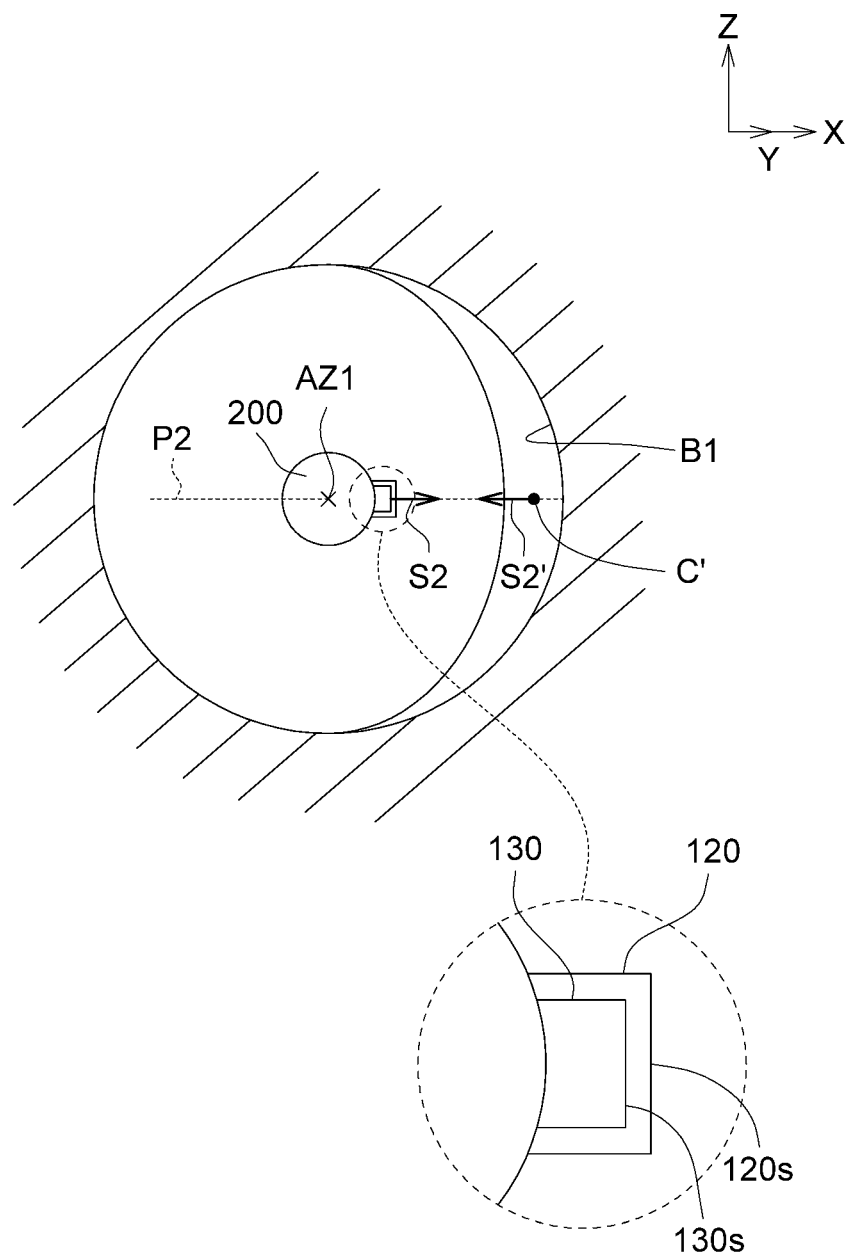
FIG. 2B is a schematic diagram of an aerial vehicle and a reflector viewed from the tail of the aerial vehicle of FIG. 2A.
Figure 2C:
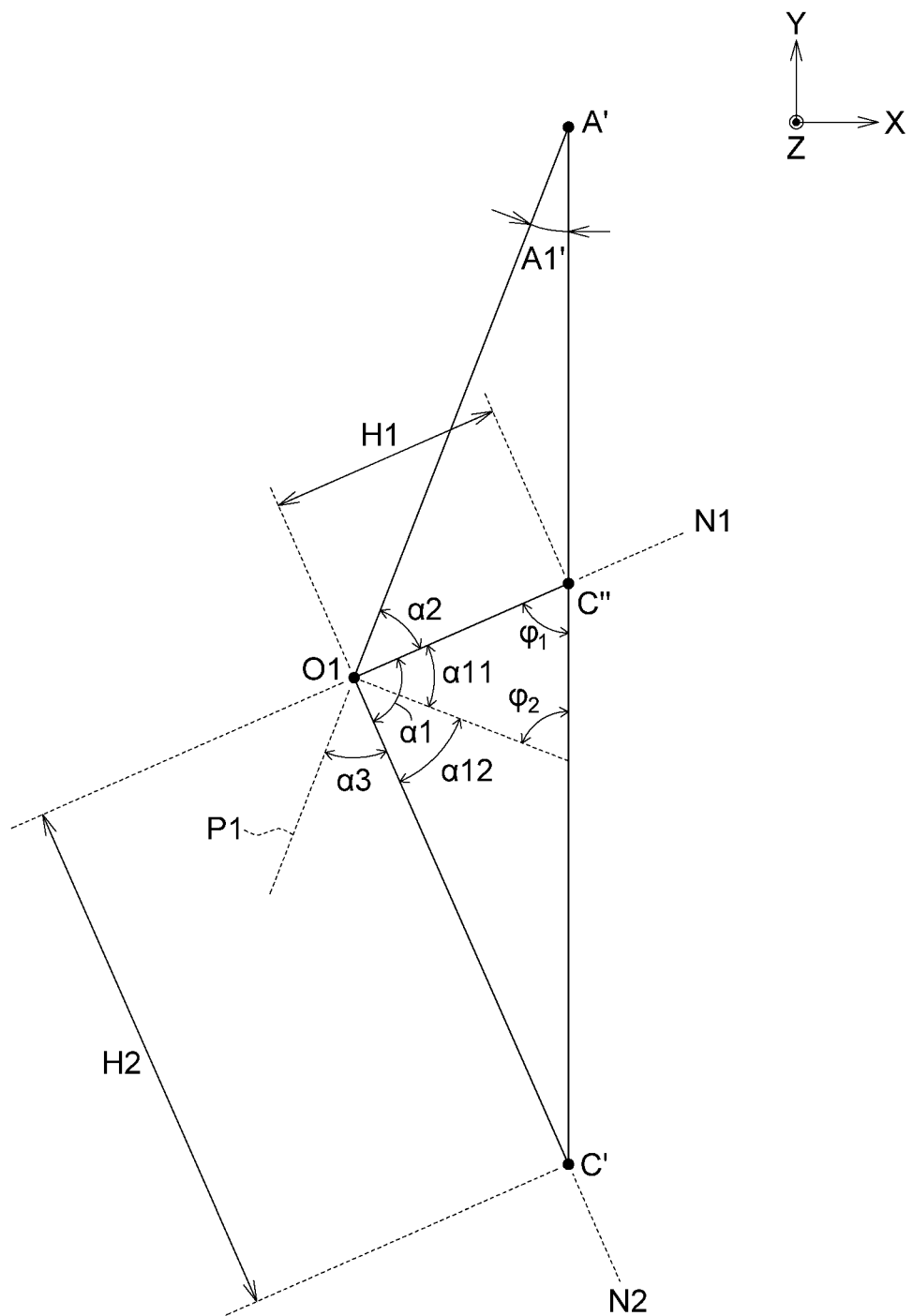
FIG. 2C is a geometric relation diagram of the aerial vehicle of FIG. 2A relative to the reflector.

Refer to FIGS. 2A-2C. FIG. 2A is a schematic diagram of an aerial vehicle 200 according to another embodiment of the present disclosure. FIG. 2B is a schematic diagram of an aerial vehicle 200 and a reflector B1 viewed from the tail of the aerial vehicle of FIG. 2A. FIG. 2C is a geometric relation diagram of the aerial vehicle 200 of FIG. 2A relative to the reflector. The aerial vehicle 200 includes a body 110, a first ranging device 120, a second ranging device 130 and a controller 140. The technical features of the aerial vehicle 200 of the present disclosure are similar or identical to that of the aerial vehicle 100 except for the disposition of the first ranging device 120 and the second ranging device 130 of the aerial vehicle 200.

As indicated in FIG. 2A, the body 110 has a longitudinal axis AZ1, a first reference plane P1 and a second reference plane P2, wherein the direction D1 and the longitudinal axis AZ1 are parallel to each other, such as overlap each other, and the first reference plane P1 and the second reference plane P2 substantially are perpendicular to each other. In the present embodiment, as indicated in FIG. 2B, the extending of the second reference plane P2 substantially passes through the first signal emission surface 120s, the second signal emission surface 130s and the longitudinal axis AZ1, such that the first distance H1 and the second distance H2 are located on the same datum plane (the second reference plane P2 of FIG. 2B) with the direction D1, and the angle obtained according to the first distance H1 and the second distance H2 gets closer to the actual included angle A1 of the body 110.

As indicated in FIGS. 2A and 2B, the first normal direction N1 of the first signal emission surface 120s of the first ranging device 120 (the first normal direction N1 is substantially parallel to the emission direction of the first detection signal S1) and the second normal direction N2 of the second signal emission surface 130s of the second ranging device 130 (the second normal direction N2 is substantially parallel to the emission direction of the second detection signal S2) intersect at an intersection O1. The first reference plane P1 passes through the intersection O1 and is substantially parallel to the direction D1, such that the included angle A1' between the first reference plane P1 and the reflector B1 is equivalent to the included angle A1 between the direction D1 and the reflector B1.

In the present embodiment, the first signal emission surface 120s and the second signal emission surface 130s are not co-planar. For example, as indicated in FIGS. 2A and 2C, a first angle $\alpha 1$ is formed between the first normal direction N1 of the first signal emission surface 120s and the second normal direction N2 of the second signal emission surface 130s, wherein the first angle $\alpha 1$ is not equivalent to 0° or 180°, that is, the first signal emission surface 120s and the second signal emission surface 130s are not co-planar. In an embodiment, the first angle $\alpha 1$ is equivalent to 90°, that is, the first signal emission surface 120s and the second signal emission surface 130s are perpendicular to each other.

As indicated in FIGS. 2A and 2C, the first reference plane P1, the reflector B1, the intersection O1 and the second distance H2 form a triangle A'O1C', which is not a right triangle. An included angle A1' is formed between the first reference plane P1 and the reflector B1 of the triangle A'O1C'. Since the first reference plane P1 passes through the intersection O1 and is substantially parallel to the direction D1, the included angle A1' is equivalent to the included angle A1. In other words, the included angle A1 can be obtained as long as the included angle A1' is obtained. The included angle A1' can be obtained according to formulas (2)~(4) below:

$$\varphi 1 = \tan^{-1}\left(\frac{\overline{O1C'}}{\overline{O1C''}}\right) \quad (2)$$

$$\varphi 2 = \pi - \alpha 11 - \varphi 1 \quad (3)$$

$$A1' = \pi - \alpha 2 - \alpha 11 - \varphi 2 \quad (4)$$

Refer to formulas (2)~(4) and FIG. 2C. The second angle $\alpha 2$ represents the angle between the first normal direction N1 of the first signal emission surface 120s and the first reference plane P1 (or direction D1); the third angle $\alpha 3$ represents the angle between the second normal direction N2 of the second signal emission surface 130s and the first reference plane P1 (or direction D1); the first angle $\alpha 1$ can be divided into angle $\alpha 11$ and angle $\alpha 12$; $\overline{O1C'}$ is equivalent to a sum of the distance from the second emission surface 130s to the intersection O1 and the second distance H2; $\overline{O1C''}$ is equivalent to a sum of the distance from the first emission surface 120s to the intersection O1 and the first distance H1. In an embodiment, the angle $\alpha 11$, the angle $\alpha 12$, the second angle $\alpha 2$ and the third angle $\alpha 3$ all are 45°, but the present disclosure is not limited thereto. Moreover, the second angle $\alpha 2$ and the third angle $\alpha 3$ may vary with the included angle A1 between the direction D1 and the reflector B1. The present disclosure does not specify the value of angle $\alpha 11$ or the value of angle $\alpha 12$, and any values would do as long as the controller 140 can quickly calculate the included angle A1. In an embodiment, the sum of the angle $\alpha 11$ and the second angle $\alpha 2$ is a constant, such as 90°, and the sum of the angle $\alpha 12$ and the third angle $\alpha 3$ is also a constant, such as 90°, but the present disclosure is not limited thereto.

Figure 3A:
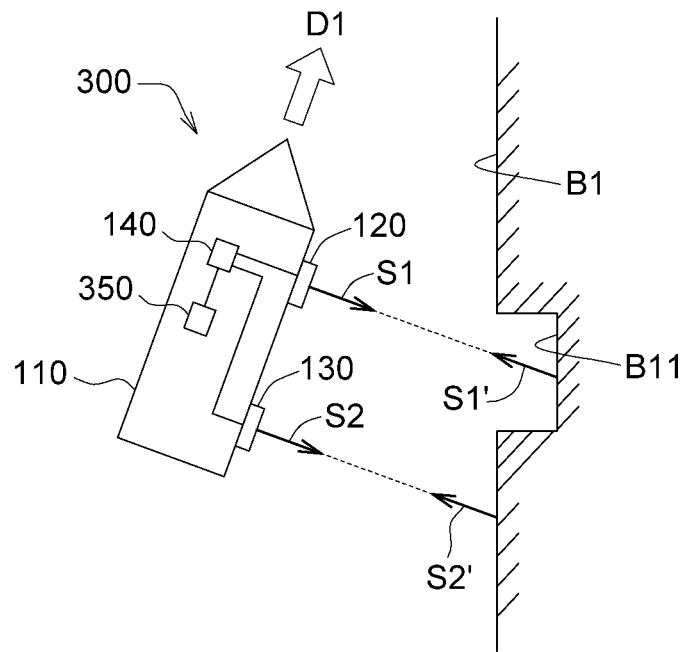
FIG. 3A is a schematic diagram of an aerial vehicle according to another embodiment of the present disclosure.
Figure 3B:
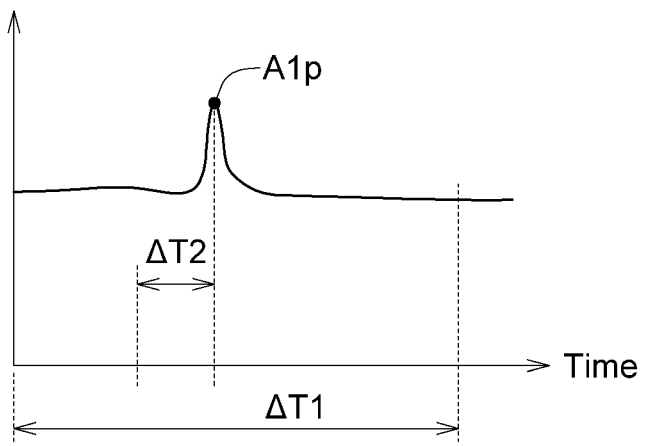
FIG. 3B is a relation diagram of the included angle detected by the aerial vehicle of FIG. 3A vs. time.

Refer to FIGS. 3A and 3B. FIG. 3A is a schematic diagram of an aerial vehicle 300 according to another embodiment of the present disclosure. FIG. 3B is a relation diagram of the included angle A1 detected by the aerial vehicle 300 of FIG. 3A vs. time. The aerial vehicle 300 includes a body 110, a first ranging device 120, a second ranging device 130, a controller 140 and an angular velocity detector 350. The technical features of the aerial vehicle 300 are similar or identical to that of the aerial vehicle 100 except that the aerial vehicle 300 further includes an angular velocity detector 350 configured to detect the angular velocity of the body 110. The angular velocity detector 350 can be realized by such as a gyroscope or an acceleration detector. In another embodiment, the angular velocity of the body 110 can be fed back to the controller 140 by a control device (not illustrated), which controls the flight of the body. Under such design, the aerial vehicle 300 can selectively omit the angular velocity detector 350.

The aerial vehicle 300 of the present disclosure can filter off abnormal angles to avoid abnormal angles negatively affecting the route of the aerial vehicle 300. As indicated in FIG. 3A, when the reflector B1 has an irregular structure or the structure of the reflector B1 has an abrupt change such as a recess B11, the value of the included angle A1 obtained by the aerial vehicle 300 will have an abrupt change, such as a sudden jump (FIG. 3B) or a sudden drop. Since the angle with numerical mutation can only represent a local change of the reflector B1 but not the overall change of the reflector B1, the aerial vehicle 300 can neglect the included angle A1p with numerical mutation.

In the present disclosure, the controller 140 is further configured to: (1) determine whether the included angle A1p with numerical mutation exists in plural angles A1 within a time interval $\Delta T1$; (2) determine whether the angular velocity of the body 110 has changed; (3) filter off (that is, neglect or does not consider) the included angle A1p with numerical mutation if the included angle A1p with numerical mutation exists and the angular velocity of the body 110 remains unchanged. Thus, the problem of the aerial vehicle 300 incorrectly determining the route due to the included angle A1p with numerical mutation and accordingly correcting an incorrect route can be avoided. In an embodiment, a ratio of the absolute value of the difference between the value of the included angle A1p and an average value of the values of plural angles A1 within previous time interval (such as time interval $\Delta T2$) to the average value is such as larger than a predetermined threshold. In other words, when the included angle A1 obtained by the controller 140 matches the said ratio, it can be determined that the included angle A1 is the included angle A1p with numerical mutation.

Figure 4:
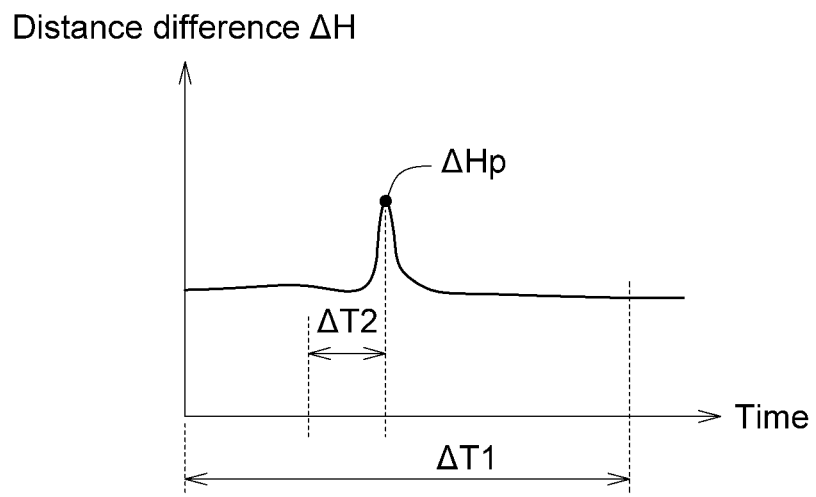
FIG. 4 is a relation diagram of the distance difference between the first distance and the second distance detected by the aerial vehicle of FIG. 3A vs. time.

Referring to FIG. 4, a relation diagram of the distance difference ΔH between the first distance H1 and the second distance H2 detected by the aerial vehicle 300 of FIG. 3A vs. time is shown. The aerial vehicle 300 includes a body 110, a first ranging device 120, a second ranging device 130, a controller 140 and an angular velocity detector 350. The angular velocity detector 350 is configured to detect the angular velocity of the body 110. In the present disclosure, the controller 140 is further configured to: (1) obtain plural distance differences ΔH between plural first distances H1 and plural second distances H2 within a time interval ΔT1; (2) determine whether the distance difference ΔHp with numerical mutation exists in distance differences ΔH; (3) determine whether the angular velocity of the body 110 has changed; (4) filter off (that is, neglect or does not consider) the distance difference ΔHp with numerical mutation if the distance difference ΔHp with numerical mutation exists in the distance differences ΔH and the angular velocity of the body 110 remains unchanged. Thus, the problem of the aerial vehicle 300 incorrectly determining the route due to the distance difference ΔHp with numerical mutation and accordingly correcting an incorrect route can be avoided. In an embodiment, a ratio of the absolute value of the difference between the value of the distance difference ΔH and an average value of the values of plural distance differences ΔH within the previous time interval (such as time interval ΔT2) to the average value is such as larger than a predetermined threshold. In other words, when the distance difference ΔH obtained by the controller 140 matches the said ratio, it can be determined that the distance difference ΔH is the distance difference ΔHp with numerical mutation.

Figure 5:
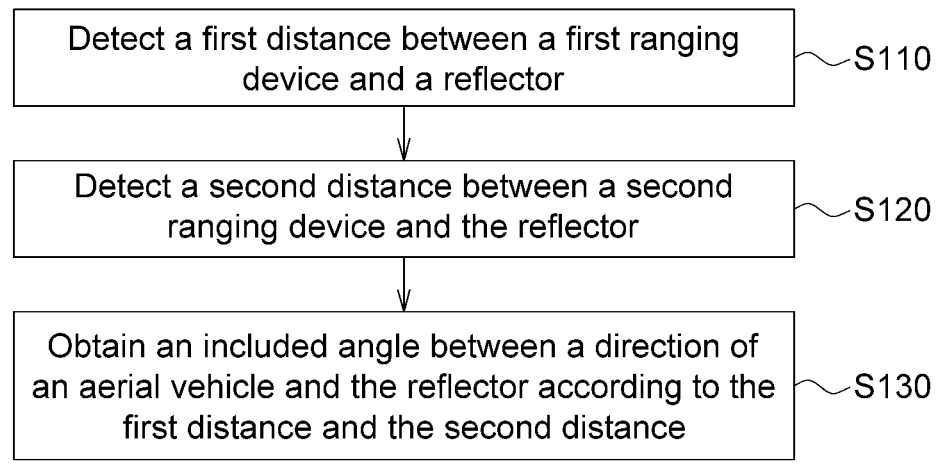
FIG. 5 is a flowchart of a direction detecting method of the aerial vehicle of FIG. 1A.

Referring to FIG. 5, a flowchart of a direction detecting method of the aerial vehicle 100 of FIG. 1A is shown. In step S110, a first distance H1 between the first ranging device 120 and the reflector B1 is detected by the first ranging device 120 of the aerial vehicle 100. In step S120, a second distance H2 between the second ranging device 130 and the reflector B1 is detected by the second ranging device 130 of the aerial vehicle 100. In step S130, an included angle A1 between the direction D1 of the body 110 of the aerial vehicle 100 and the reflector B1 is obtained by the controller 140 of the aerial vehicle 100 according to the first distance H1 and the second distance H2. Detailed steps of the method for obtaining the included angle A1 are already disclosed in above embodiments, and are not repeated here. Besides, the steps of the method for detecting the direction of the aerial vehicle 200 and 300 can be similar to that of the method for detecting the direction of the aerial vehicle 100 and are not repeated here.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An aerial vehicle, comprising:
a body;
a first ranging device disposed on the body and configured to detect a first distance between the first ranging device and a surface of a reflector;
a second ranging device disposed on the body and configured to detect a second distance between the second ranging device and the surface of the reflector; and
a controller configured to obtain an included angle between a direction of the body and the reflector according to the first distance and the second distance;
wherein the reflector is a physical reflector;
wherein the first ranging device has a first signal emission surface, and the second ranging device has a second signal emission surface: a first angle is formed between a first normal direction of the first signal emission surface and a second normal direction of the second signal emission surface, and a second angle is formed between the first normal direction of the first signal emission surface and the direction: the controller is further configured to:
obtain the included angle between the direction and the reflector according to the first distance, the second distance, the first angle and the second angle, wherein the second distance, the direction of the body and the surface of the reflector form a triangle.

2. The aerial vehicle according to claim 1, wherein the body has a first reference plane parallel to the direction; the first signal emission surface and the second signal emission surface overlap the first reference plane.

3. The aerial vehicle according to claim 1, wherein the body has a longitudinal axis and a second reference plane, the direction is parallel to the longitudinal axis, and extending of the second reference plane passes through the first signal emission surface, the second signal emission surface and the longitudinal axis;
wherein the direction is a flight direction of the aerial vehicle.

4. The aerial vehicle according to claim 1, wherein the second signal emission surface is perpendicular to the first signal emission surface.

5. The aerial vehicle according to claim 1, wherein the direction is a flight direction of the aerial vehicle.

6. The aerial vehicle according to claim 5, wherein the first angle is 90°, and the second angle is 45°.

7. The aerial vehicle according to claim 5, wherein the body has a first reference plane passing through an intersection of the first normal direction and the second normal direction and parallel to the direction.

8. The aerial vehicle according to claim 1, further comprising:
an angular velocity detector configured to detect an angular velocity of the body;
wherein the controller is further configured to:
determine whether the included angle with numerical mutation exists in a plurality of included angles within a time interval;
determine whether an angular velocity of the body has changed;
filter off the included angle with numerical mutation if the included angle with numerical mutation exists in the included angles and the angular velocity of the body remains unchanged.

9. The aerial vehicle according to claim 1, further comprising:
an angular velocity detector configured to detect an angular velocity of the body;
wherein the controller is further configured to:
obtain a plurality of distance differences between a plurality of first distances and a plurality of the second distances within a time interval;
determine whether the distance difference with numerical mutation exists in the distance differences;
determine whether an angular velocity of the body has changed;

filter off the distance difference with the numerical mutation if the distance difference with the numerical mutation exists in the distance differences and the angular velocity of the body remains unchanged.

10. The aerial vehicle according to claim 1, wherein the first ranging device is located in front of the second ranging device;
wherein the body comprises a front end and a rear end, the first ranging device is closer to the front end than the second ranging device.

11. A direction detecting method, comprising:
detecting a first distance between the first ranging device and a surface of a reflector by a first ranging device of an aerial vehicle, wherein the reflector is a physical reflector;
detecting a second distance between a second ranging device and the surface of the reflector by the second ranging device of the aerial vehicle; and
obtaining an included angle between a direction of a body of the aerial vehicle and the reflector by a controller of the aerial vehicle according to the first distance and the second distance;
wherein the first ranging device has a first signal emission surface, and the second ranging device has a second signal emission surface; a first angle is formed between a first normal direction of the first signal emission surface and a second normal direction of the second signal emission surface, and a second angle is formed between the first normal direction of the first signal emission surface and the direction;
wherein obtaining the included angle between the direction of the body of the aerial vehicle and the reflector by the controller of the aerial vehicle according to the first distance and the second distance comprising:
obtain the included angle between the direction and the reflector according to the first distance, the second distance, the first angle and the second angle, wherein the second distance, the direction of the body and the surface of the reflector form a triangle by the controller.

12. The direction detecting method according to claim 11, wherein the body has a first reference plane parallel to the direction; the first signal emission surface and the second signal emission surface overlap the first reference plane.

13. The direction detecting method according to claim 11, wherein the body has a longitudinal axis and a second reference plane, the direction is parallel to the longitudinal axis, and the extending of the second reference plane passes through the first signal emission surface, the second signal emission surface and the longitudinal axis;
wherein the direction is a flight direction of the aerial vehicle.

14. The direction detecting method according to claim 11, wherein the second signal emission surface is perpendicular to the first signal emission surface.

15. The direction detecting method according to claim 11, wherein in obtaining the included angle between the direction of the body of the aerial vehicle and the reflector by the controller of the aerial vehicle according to the first distance and the second distance, the direction is a flight direction of the aerial vehicle.

16. The direction detecting method according to claim 15, wherein the first angle is 90°, and the second angle is 45°.

17. The direction detecting method according to claim 15, wherein the body has a first reference plane passing through an intersection of the first normal direction and the second normal direction and parallel to the direction.

18. The direction detecting method according to claim 11, further comprising:
detecting an angular velocity of the body by an angular velocity detector of the aerial vehicle;
determining, by the controller, whether within a time interval the included angle with numerical mutation exists in a plurality of included angles;
determining, by the controller, whether an angular velocity of the body has changed; and
filtering off the included angle with the numerical mutation by the controller if the included angle with the numerical mutation in the included angles and the angular velocity of the body remains unchanged.

19. The direction detecting method according to claim 11, further comprising:
detecting an angular velocity of the body by an angular velocity detector of the aerial vehicle;
obtaining a plurality of distance differences between a plurality of first distances and a plurality of the second distance within a time interval by the controller;
determining, by the controller, whether the distance difference with numerical mutation exists in the distance differences;
determining, by the controller, whether an angular velocity of the body has changed; and
filtering off the distance difference with numerical mutation by the controller if the distance difference with numerical mutation exists in the distance differences and the angular velocity of the body remains unchanged.

20. The direction detecting method according to claim 11, wherein the first ranging device is located in front of the second ranging device;
wherein the body comprises a front end and a rear end, the first ranging device is closer to the front end than the second ranging device.

* * * * *